United States Patent
Oho et al.

(10) Patent No.: US 10,503,140 B2
(45) Date of Patent: Dec. 10, 2019

(54) CONTROL DEVICE FOR MACHINE TOOL PERFORMING OSCILLATION CUTTING

(71) Applicant: FANUC CORPORATION, Yamanashi (JP)

(72) Inventors: Yusaku Oho, Yamanashi (JP); Kenta Yamamoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 70 days.

(21) Appl. No.: 15/945,474

(22) Filed: Apr. 4, 2018

(65) Prior Publication Data

US 2018/0299857 A1    Oct. 18, 2018

(30) Foreign Application Priority Data

Apr. 14, 2017   (JP) ................................ 2017-080608

(51) Int. Cl.
*G05B 19/25*     (2006.01)
*G05B 13/02*     (2006.01)

(52) U.S. Cl.
CPC .......... *G05B 19/25* (2013.01); *G05B 13/028* (2013.01); *G05B 2219/49229* (2013.01)

(58) Field of Classification Search
None
See application file for complete search history.

(56) References Cited

U.S. PATENT DOCUMENTS

| 5,911,802 A * | 6/1999 | Kimura ................... B23B 25/02 |
| | | 82/1.11 |
| 8,257,002 B2 * | 9/2012 | Prust ...................... B23B 47/34 |
| | | 408/1 R |
| 2009/0107308 A1 | 3/2009 | Woody et al. |
| 2016/0011579 A1 * | 1/2016 | Watanabe .......... G05B 19/4103 |
| | | 700/187 |

FOREIGN PATENT DOCUMENTS

| CN | 101063608 A | 10/2007 |
| CN | 105209991 A | 12/2015 |
| JP | 2005-327191 A | 11/2005 |

(Continued)

*Primary Examiner* — Mohammad Ali
*Assistant Examiner* — David Earl Ogg
(74) *Attorney, Agent, or Firm* — Hauptman Ham, LLP

(57) ABSTRACT

An oscillation permission/prohibition notification part of a control device notifies an oscillation command generation part of generation permission of the oscillation command when a position command value has not reached within a predetermined range of a machining end point of a workpiece, and notifies the oscillation command generation part of generation prohibition when the position command value has reached within the predetermined range. A control part includes a learning controller and a learning determination part. The learning determination part determines whether the oscillation command generation part has been notified of generation permission or generation prohibition of the oscillation command, turns learning control on when notification of generation permission of the oscillation command has been received, and sets the oscillation command to zero and turns off learning control when notification of generation prohibition of the oscillation command has been received.

10 Claims, 10 Drawing Sheets

(56) References Cited

FOREIGN PATENT DOCUMENTS

| | | |
|---|---|---|
| JP | 2006-172149 A | 6/2006 |
| JP | 5033929 B1 | 7/2012 |
| JP | 5033929 B1 | 9/2012 |
| JP | 5139592 B1 | 2/2013 |
| JP | 2014-48953 A | 3/2014 |
| JP | 5599523 B1 | 8/2014 |
| JP | 5599523 B1 | 10/2014 |
| JP | 2017-33306 A | 2/2017 |
| JP | 2017-56515 A | 3/2017 |
| WO | 2015/140905 A1 | 9/2015 |
| WO | 2015/162739 A1 | 10/2015 |
| WO | 2016047485 A1 | 3/2016 |

* cited by examiner

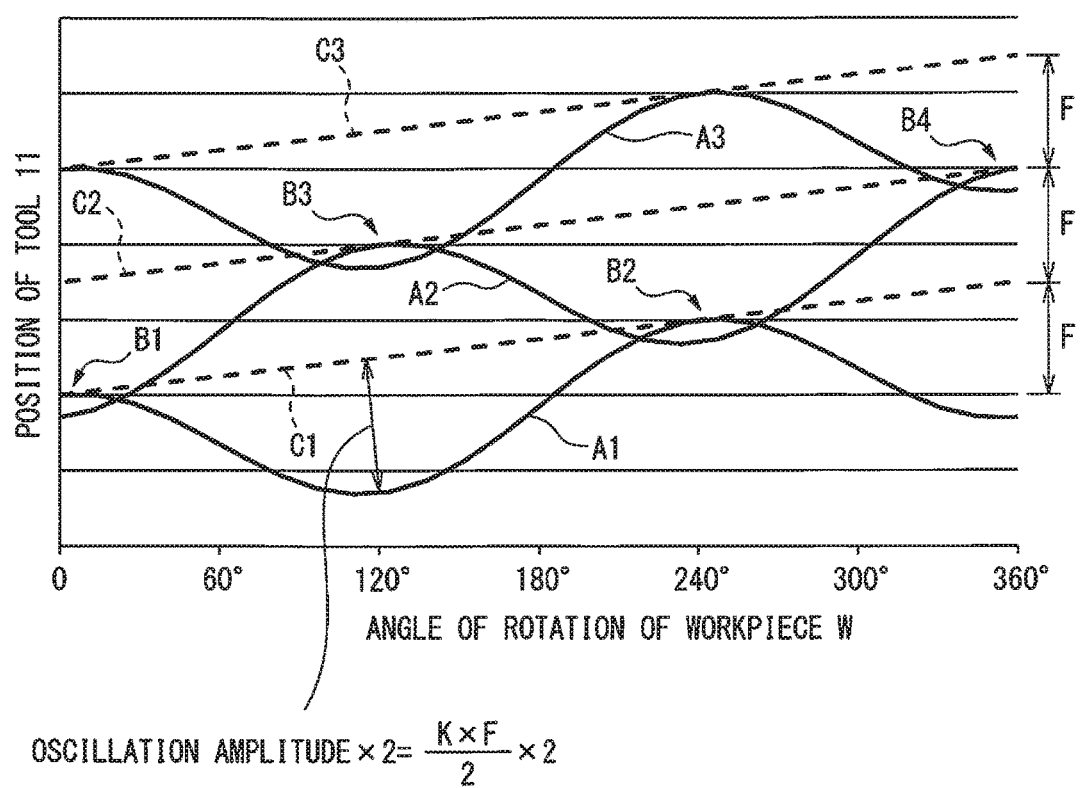

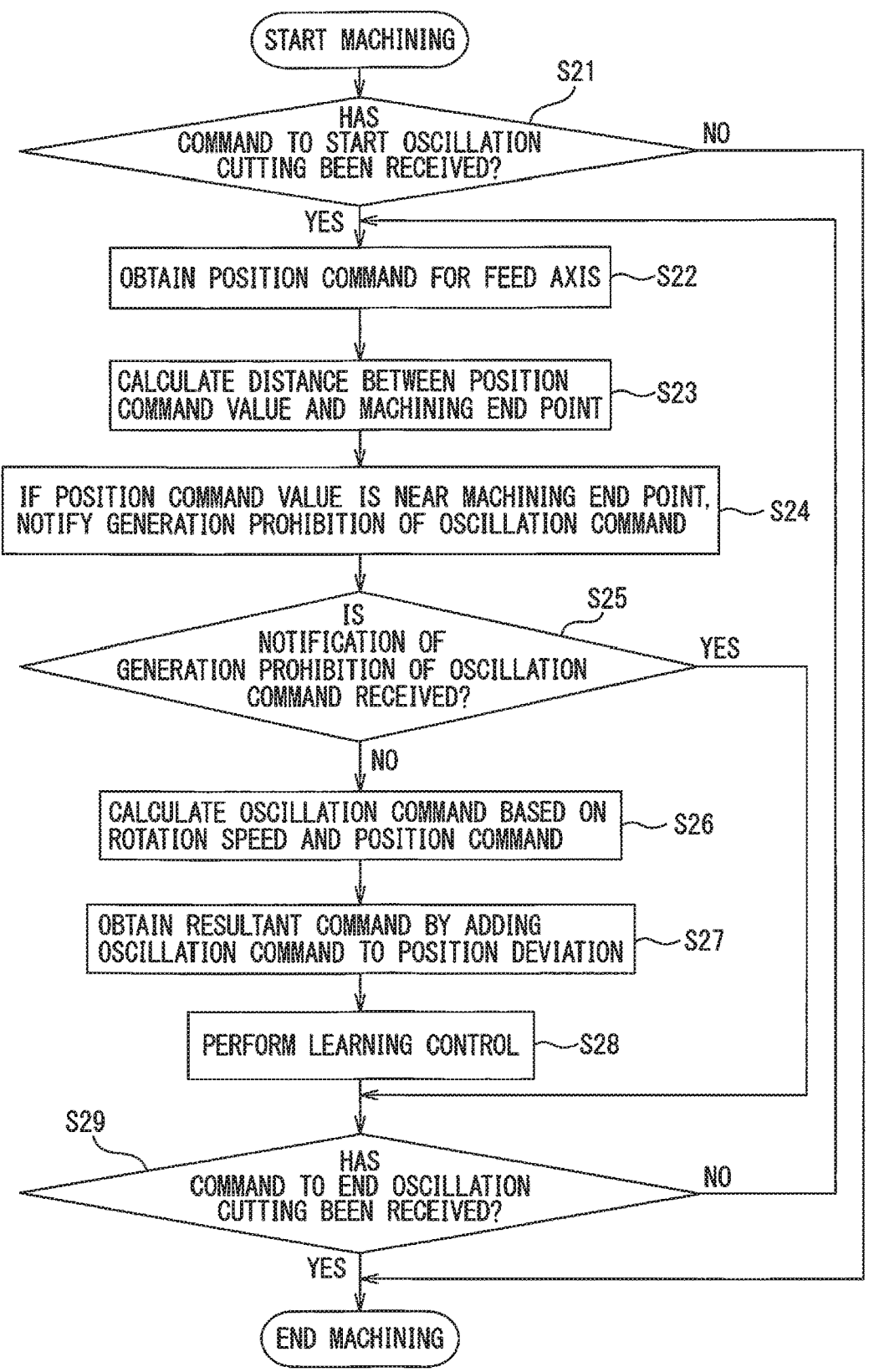

CONTROL DEVICE FOR MACHINE TOOL PERFORMING OSCILLATION CUTTING

RELATED APPLICATIONS

The present application claims priority to Japanese Application Number 2017-080608, filed on Apr. 14, 2017, the disclosure of which is hereby incorporated by reference herein in its entirety.

BACKGROUND OF THE INVENTION

1. Field of the Invention

The present invention relates to a control device for a machine tool which performs oscillation cutting.

2. Description of the Related Art

When swarf is continuously generated, during the machining of a workpiece using the cutting tool of a machine tool, the swarf may become entangled with the cutting tool. In such a case, it is necessary to stop the machine tool in order to remove the swarf from the cutting tool, which is time consuming and reduces production efficiency. Further, there is a risk that the workpiece may be damaged by the swarf, reducing the quality of the workpiece.

In order to avoid such drawbacks, oscillation cutting, in which swarf is shredded by oscillating the cutting tool relative to the workpiece in the machining feed direction, is known (refer to, for example, Japanese Patent No. 5033929, Japanese Patent No. 5139592, or Japanese Patent No. 5599523).

Regarding the oscillation cutting described above, techniques for avoiding the problem that the cutting tool cuts beyond a predetermined machining stop position by reducing the oscillation amplitude of the cutting tool as the cutting tool approaches the predetermined machining stop position on the workpiece in the machining feed direction have been proposed (refer to, for example WO 2016/047485). Hereinafter, such a problem will be referred to as overshoot.

Furthermore, in machine tools, learning control has been proposed to increase the positional accuracy of driven objects such as cutting tools or workpieces driven by servo motors (refer to, for example, FIG. 6 of Japanese Unexamined Patent Publication (Kokai) No. 2006-172149). Learning control is a control in which, with respect to a signal to command a driven body to perform the same pattern of operations at a predetermined period, a correction amount necessary to correct position deviation, which is the difference between the position command value and the position feedback value, and the correction amount which has been obtained one period prior is applied to the position deviation. By repeatedly performing this learning control for the same pattern of the periodic operations, a correction amount for converging the position deviation to zero can be obtained.

In a machine tool that performs the above-mentioned oscillation cutting, if there is backlash in the drive mechanism part of the cutting tool or workpiece or when the rigidity of the drive mechanism part is low, vibration is generated if the control gain is set high in order to improve the responsiveness of the servo, such that the position accuracy of tool or workpiece may not be stable. In such a case, even though it is difficult to improve the responsiveness of the servo, if learning control is applied to the oscillation cutting, it is possible to achieve high-precision control for the periodic motion commands that relatively oscillate the tool or workpiece in the machining feed direction.

SUMMARY OF THE INVENTION

However, if the oscillation amplitude of the cutting tool is reduced as the cutting tool approaches the machining end point on the workpiece in the machining feed direction, in order to prevent overshoot as described above, the oscillation pattern for each predetermined period is gradually decreased from the period prior to the machining end point. As described above, learning control is a control of applying the correction amount, which is obtained in the repeated operation pattern one period prior, to the position deviation. Thus, when learning control is applied to the oscillation control, even if a command of the oscillation pattern not exceeding the machining end point is outputted as the operation command at the machining end point, the correction amount in the oscillation pattern one cycle before is applied to the operation command, bringing about a problem in that overshoot cannot be prevented. If a portion of the workpiece is in front of the tool in the machining feed direction, an unintended cut can occur in the workpiece due to overshoot. In view of such problems due to overshoot, as well, higher precision oscillation cutting is desired.

A first aspect of the present disclosure provides a control device for controlling a machine tool for cutting an outer peripheral surface or an inner peripheral surface of a workpiece with a tool, the machine tool having a spindle for performing a relative rotation between the workpiece and the tool around a central axis of the workpiece, and at least one feed axis for performing a relative feeding between the tool and the workpiece along a generatrix of the outer peripheral surface or the inner peripheral surface of the workpiece, the control device comprising:

a position command generation part for generating a position command for the at least one feed axis based on a relative rotation speed of the workpiece and the tool and a relative feed speed of the tool and the workpiece; and a feed axis control part that controls the at least one feed axis according to the position command, wherein the feed axis control part includes an oscillation command generation part that generates an oscillation command for the at least one feed axis based on the rotation speed and the position command such that the tool intermittently cuts the workpiece at an oscillation frequency which is a positive non-integral multiple of the rotation speed, and the feed axis control part is configured to control the at least one feed axis based on a resultant command obtained by adding the oscillation command to a position deviation, which is a difference between the position command and an actual position of the at least one feed axis;

the control device further comprising an oscillation permission/prohibition notification part which notifies the oscillation command generation part of generation permission of the oscillation command when the value of the position command is not within a predetermined range from the machining stop point of the workpiece which has been stored in the control device in advance, and which notifies the oscillation command generation part of generation prohibition of the oscillation command when the value of the position command is within the predetermined range; wherein the feed axis control part further comprises:

a learning controller which performs learning control to obtain a correction amount of the resultant command based on an oscillation phase obtained from the oscillation command and the resultant command and which adds the correction amount to the resultant command; and a determination part which determines whether the oscillation command generation part has been notified of generation permission or generation prohibition of the oscillation command, and in the determination, when notification of generation permission of the oscillation command has been received, the learning control is turned on, and when notification of generation prohibition of the oscillation command has been received, the oscillation command is set to zero and the learning control is turned off.

According to the first aspect, since learning control is applied to the oscillation cutting, compliance with the oscillation command can be enhanced. Further, the problem of overshoot can be solved.

The objects, features and advantages of the present invention, as well as other objects, features and advantages will be further clarified from the detailed description of the representative embodiments of the present disclosure as shown in the accompanying drawings.

BRIEF DESCRIPTION OF THE DRAWINGS

FIG. 5 is a drawing showing the relationship between feed amount and angle of rotation.

FIG. 10 is a flow chart showing an example of the operations of the control device shown in FIG. 6.

DETAILED DESCRIPTION

Figure 1:
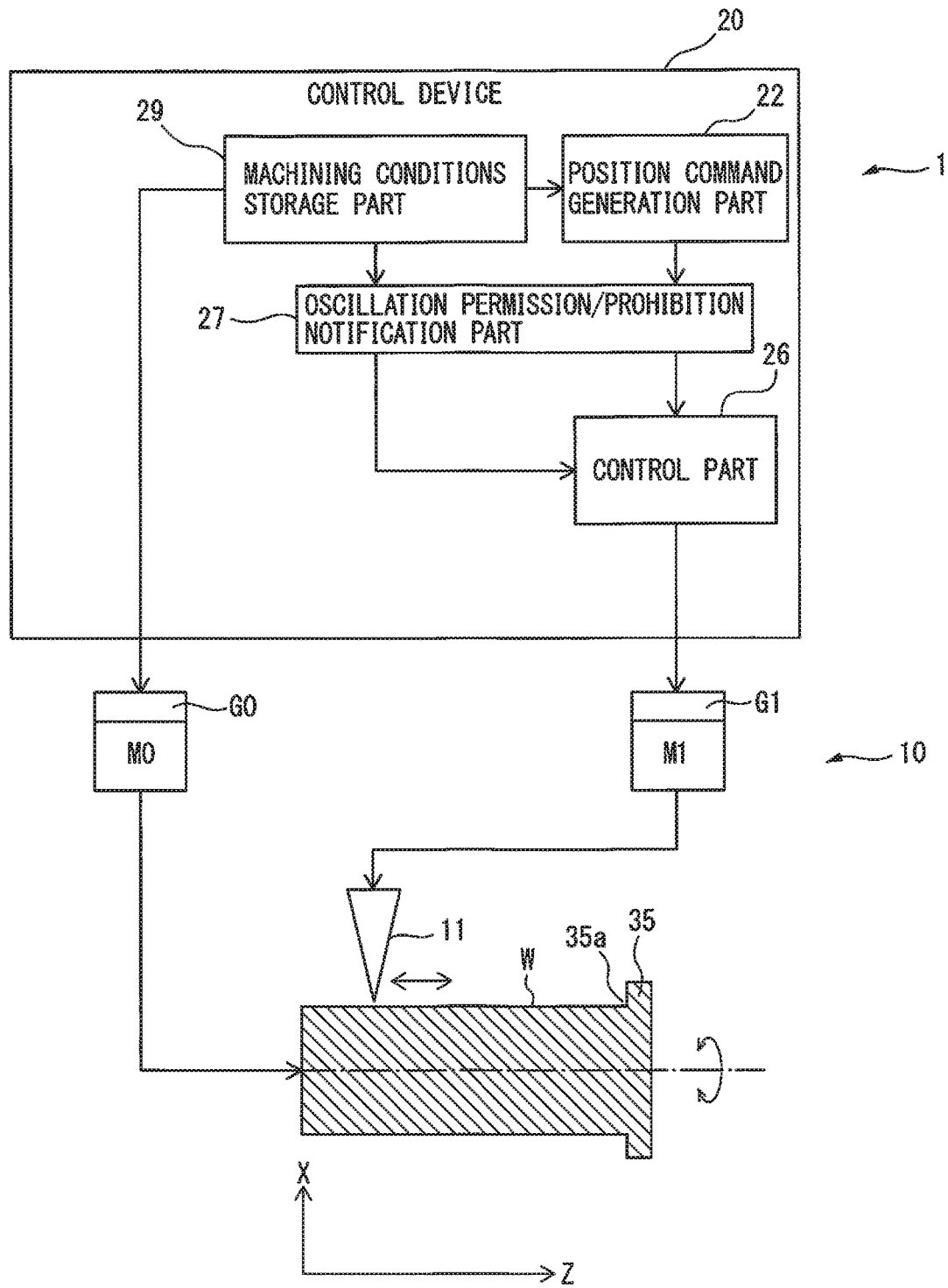
FIG. 1 is a view of a machining system including a control device of an embodiment.

Then, the embodiments of the present disclosure will be described. with reference to the drawings. In the referenced drawings, the same components or functional elements are given the same reference numerals. For the ease of understanding, the drawings have been appropriately modified in scale. Further, the embodiments shown in the drawings are only examples for carrying out the present invention, and the present invention is not limited to the illustrated embodiments.

FIG. 1 is a view showing a machining system 1 including a control device 20 of the embodiment. As shown in FIG. 1, the machining system 1 includes a machine tool 10, and the control device 20 which controls the machine tool 10. The machine tool 10 includes a tool 11, and the tool 11 cuts a workpiece having, for example, a cylindrical shape, a columnar shape, a conical shape, a truncated conical shape, or the like. In the example shown in FIG. 1, the tool 11 is intended to cut the outer peripheral surface of the columnar body of the workpiece W, the greater part of which is columnar. Furthermore, in FIG. 1, etc., the center axis of the workpiece, which is the rotation axis of the workpiece, is defined as the Z axis, and the axis perpendicular to the Z axis is defined as the X axis. The machine tool 10 can also cut the outer peripheral surface or the inner peripheral surface of a workpiece, such as a columnar body, having an elliptical cross section if the position of the tool 11 in the X axis direction is appropriately adjusted.

FIG. 1 shows a substantially columnar workpiece W having a projection 35 projecting radially outwardly from workpiece W at the end of the outer peripheral surface thereof. The spindle M0 of the machine tool 10 rotates the workpiece W about its central axis. The feed axis M1 of the machine tool 10 moves the tool 11 along the generatrix of the outer peripheral surface of the workpiece W, and reciprocates, i.e., oscillates, the tool 11 along the generatrix of the outer peripheral surface of the workpiece W. In the case of a workpiece shaped as shown in FIG. 1, the tool 11 is moved along the generatrix of the outer peripheral surface of the cylindrical body constituting the greater part of the workpiece W.

The feed axis M1 includes a feeding mechanism for the tool 11 and a servo motor to drive the feeding mechanism. The feed axis M1 cooperates with the spindle M0 to feed the tool 11 and cut the workpiece W. Note that though the required torque for the spindle M0 and the feed axis M1 can be estimated from inertia and the angular acceleration of the command, excluding the cutting load, detectors G0 and G1 for detecting the respective torques may be provided.

The control device 20 may be composed of a computer including a memory such as ROM (read-only memory) or RAM (random access memory), a CPU (central processing unit), and a communication control part, which are connected to each other through buses. Further, the control device 20 includes a position command generation part 22, a control part 26 (feed axis control part), an oscillation permission/prohibition notification part 27, and a machining conditions storage part 29. The function or operation of each of these parts can be achieved through cooperation of the CPU, the memory, and the control program stored in the memory installed in the computer.

In the control device 20, the machining conditions storage part 29 stores at least the machining conditions of the workpiece W. A host computer (not shown), such as a CNC (computer numerical controller), a PLC (programmable logic controller), or the like, is connected to the control device 20, and the machining conditions may be input to the machining conditions storage part 29 from the host computer. The machining conditions of the workpiece W include the rotation speed of the workpiece W, the feed speed of the tool 11, and the machining end point on the workpiece W. Furthermore, the machining conditions storage part 29 stores the machining program executed by the machine tool 10, and the CPU in the control device 20 may read the rotation speed of the workpiece W and the feed speed of the tool 11 from the machining program and outputs the same to the position command generation part 22 or the control part 26, The machining conditions storage part 29 and the position command generation part 22 may be provided not in the control device 20 but in the above host computer.

The position command generation part 22 of the control device 20 has a function of generating the position command of the feed axis M1 based on the relative rotation speed of the workpiece W and the tool 11 about the center axis of the workpiece W and the relative feed speed of the tool 11 and the workpiece W. This position command is an instruction to furnish the control part 26 with the target position when the tool 11 and the workpiece W are moved relatively in the 7 axis direction.

The control part 26 of the control device 20 includes an oscillation command generation part 23 (refer to FIG. 6) which generates an oscillation command of the feed axis M1 based on the above-described rotation speed and position command so that the oscillation frequency becomes a positive, non-integral multiple with respect to the above-described rotation speed, and the tool 11 intermittently cuts the workpiece W. The oscillation command is a periodic command created so as to be asynchronous to the rotation speed about the central axis described above, and includes an oscillation frequency and an oscillation amplitude. In Formula (1) of the oscillation command, which is described later, the value obtained from the expression S/60×I corresponds to the oscillation frequency, and the value obtained from the expression K×F/2 corresponds to the oscillation amplitude.

Note that, intermittent cutting means that the tool 11 cuts the workpiece W while periodically contacting with and separating from the workpiece W, which is also referred to as oscillation cutting or vibration cutting. Furthermore, the workpiece W in FIG. 1 rotates and the tool 11 oscillates with respect to the workpiece W. However, the tool 11 may rotate about the center axis of the workpiece W, and the workpiece W may oscillate with respect to the tool 11. Furthermore, in FIG. 1, both the feeding operation and the oscillation operation of the workpiece W are performed by a single feed axis M1, but a configuration in which the feeding operation and the oscillation operation of the workpiece W are performed by separate feed axes may also be used.

The oscillation permission/prohibition notification part 27 of the control device 20 notifies the oscillation command generation part 23 of generation permission of the oscillation command when the value of the position command generated by the aforementioned position command generation part 22 has not reached within a predetermined range from the machining end point of workpiece W which was stored in advance in the machining conditions storage part 29. The oscillation permission/prohibition notification part 27 notifies the oscillation command generation part 23 of generation prohibition of the oscillation command when the value of the position command generated by the position command generation part 22 has reached within the above-described predetermined range. The oscillation command generation part 23 can generate the oscillation command only when notification of generation permission of the oscillation command has been received.

Further, the control part 26 of the control device 20 has a function of controlling the feed axis M1 based on a resultant command (for example, a position command value) obtained by adding the oscillation command to the position deviation, which is the difference between the position command and the actual position of the feed axis M1. The actual position of the feed axis M1 corresponds to a position feedback value obtained by a position detector (not shown), such as an encoder mounted on the feed axis M1.

The above-described control part 26 has a function of performing learning control to obtain a correction amount of the resultant command, based on an oscillation phase obtained from the oscillation command and the above resultant command, and to add the correction amount to the resultant command. This function corresponds to the learning controller 30 (refer to FIG. 6), which will be described later.

Figure 2:
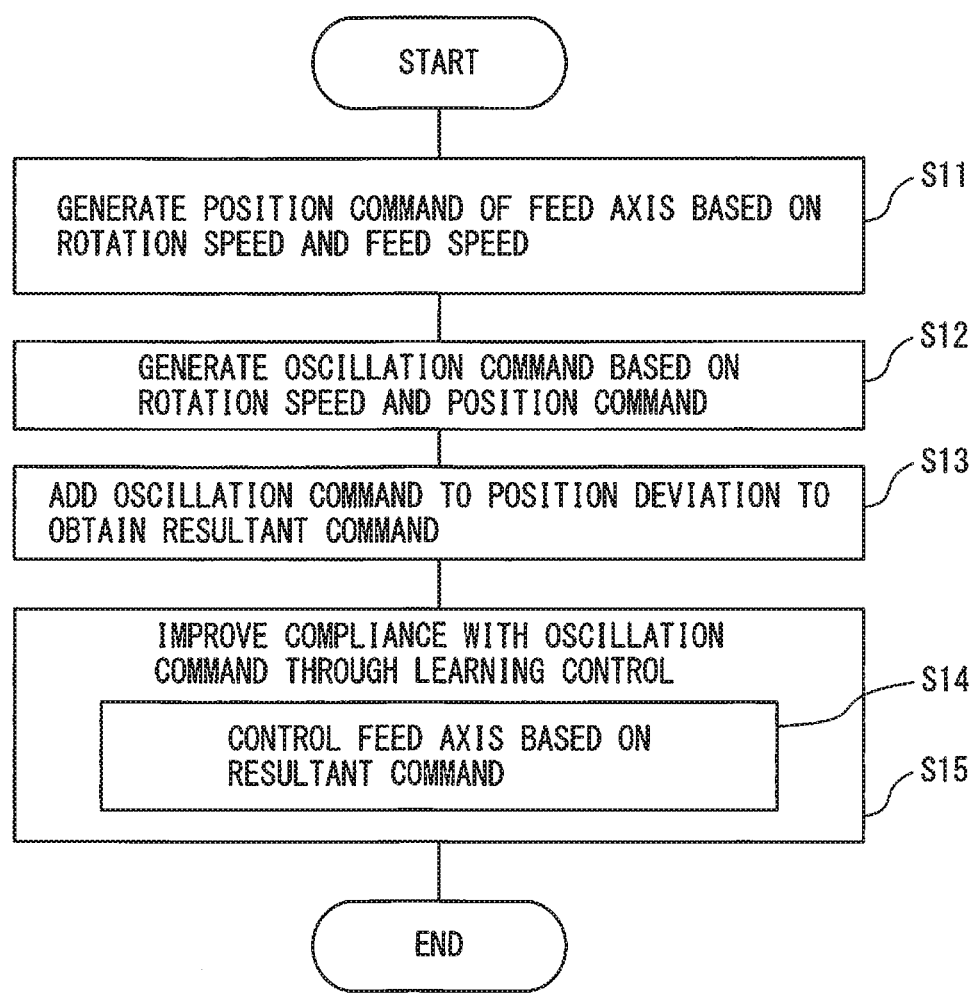
FIG. 2 is a flowchart showing the operation of the control device of the embodiment.

FIG. 2 is a flowchart showing the operation of the control device 20 of the embodiment. First, in step S11 of FIG. 2, the position command generation part 22 generates a position command of the feed axis M1 based on the rotation speed of the workpiece W and the feed speed of the tool 11 stored in the machining conditions storage part 29.

Further, in step S12, the oscillation command generation part 23 (refer to FIG. 6) in the control part 26 generates an oscillation command based on the above-described rotation speed and position command. In the example shown in FIG. 1, since the tool 11 oscillates only along the center axis of the workpiece W, only an oscillation command for the feed axis M1 is generated.

Figure 3:
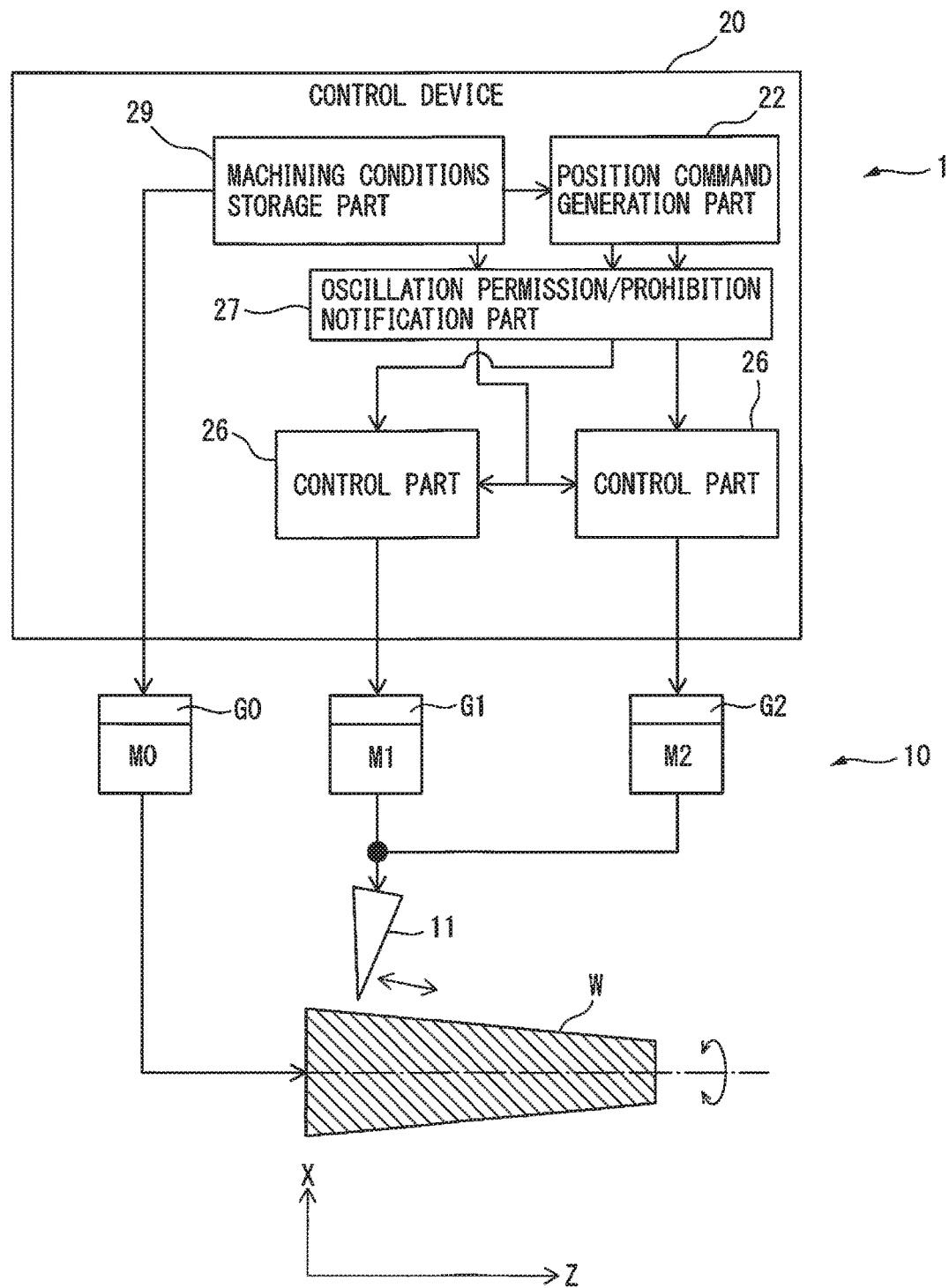
FIG. 3 is a view of another machining system including the control device of the embodiment.

FIG. 3 is a view showing another machining system including the control device 20 of the present embodiment. In the example shown in FIG. 3, a truncated conical workpiece W is arranged. In this case, the tool 11 is configured to cut the outer peripheral surface of the workpiece W by oscillating obliquely along the generatrix of the outer peripheral surface of the workpiece W. Since the tool 11 moves in a resultant direction of the X axis direction and the 7 axis direction, in order to move the tool 11, two feed axes M1 and M2 and control parts 26 for the respective feed axes are required. The feed axis M2 also includes a feed mechanism and a servomotor for driving the feed mechanism. The feed axes M1 and M2 cooperate with the spindle M0 and feed the tool 11 to cut the workpiece W. In such a case, in step S12, oscillation commands for the two feed axes M1 and M2 are generated by the oscillation command generation parts 23 of the control parts 26 of the respective feed axes M1 and M2.

Note that though the required torque for the feed axis M2 can also be estimated from inertia and the angular acceleration of the command, excluding the cutting load, a detector G2 for detecting torque may be provided. Further, a configuration in which the tool 11 is fed by a large number of feed axes and control parts therefor may be used.

Figure 4A:
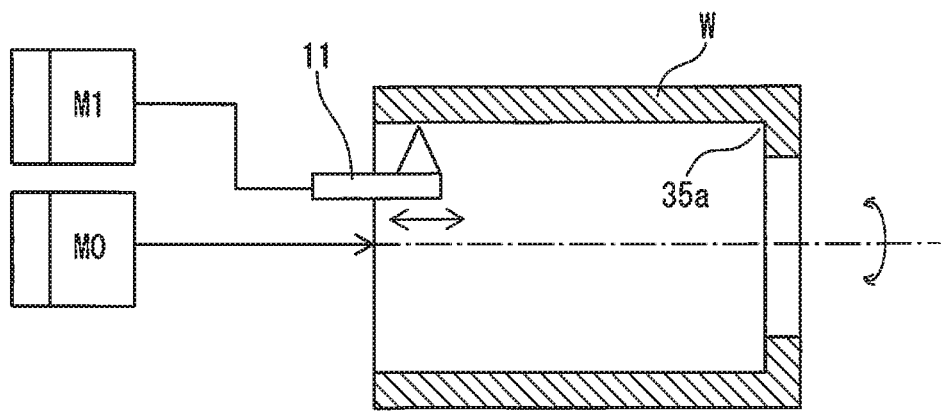
FIG. 4A is a view showing a cylindrical workpiece and a tool.

FIG. 4A shows a cylindrical workpiece and a tool different from FIG. 1. In FIG. 4A, the tool 11 oscillates along the generatrix of the inner peripheral surface of the cylindrical workpiece W and cuts the inner peripheral surface thereof. In such a case, since the feed axis M1 is the only motor used to oscillate the tool 11, an oscillation command only for the feed axis M1 is generated in step S12.

Figure 4B:
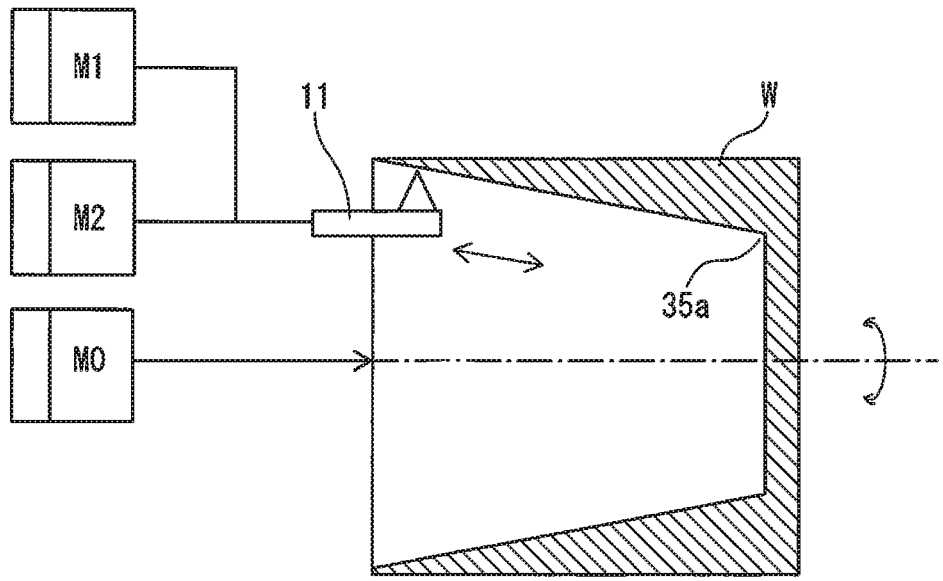
FIG. 4B is a view showing another workpiece having a frustoconical hollow portion and a tool.

In contrast thereto, FIG. 4B shows a workpiece having a frustoconical hollow portion and a tool. In FIG. 4B, the tool 11 oscillates along the generatrix of the inner peripheral surface of the workpiece W having a frustoconical hollow portion and cuts the inner peripheral surface thereof. In such a case, as described above, two feed axes M1 and M2 and a control part 26 for each of these feed axes are required, and in step S12, the oscillation commands for the two feed axes M1 and M2 are generated by the oscillation command generation parts 22 of the control parts 26 of the respective feed axes M1 and M2.

A case where the tool 11 cuts the outer peripheral surface of a columnar body portion of the workpiece W as shown in FIG. 1 will be described below. The explanation below is substantially the same as the cases shown in FIG. 3, FIG. 4A, and FIG. 4B.

FIG. 5 is a drawing showing the relationship between the feed amount and the rotation angle. In FIG. 5, the horizontal axis shows the rotation angle of the workpiece W, and the vertical axis shows the feed amount of the tool 11 in the direction of the center axis of the workpiece W (i.e., the Z axis direction). In FIG. 5, a plurality of linear dashed lines C1, C2, C3 . . . extending in the oblique direction are shown. As can be seen from FIG. 5, the vertical axis coordinate of the intersection between the dashed line C1 and the vertical axis corresponds to the vertical axis coordinate at the start point of the next dashed line C2. Similarly, the vertical axis coordinate of the intersection between the dashed line C2 and the vertical axis corresponds to the vertical axis coordinate at the start point of the next dashed. line C3. The plurality of linear dashed lines C1, C2, C3 . . . indicate the trajectory of the tool 11 on the workpiece W in the absence of an oscillation command. The curves A1, A2, A3 . . . shown in FIG. 5 indicate the trajectory of the tool 11 on the workpiece W in the presence of the oscillation command. In other words, the dashed lines C1, C2, C3, etc., indicate only the position commands before the oscillation commands are added thereto (the original command values), and the curves A1, A2, A3, etc., show the position commands after the oscillation commands have been added thereto. Therefore, the curves A1, A2, A3 indicate commands obtained by adding the cosine wave-like oscillation commands to the respective position commands represented by the dashed lines C1, C2, C3.

Furthermore, curve A1 is the trajectory of the tool 11 in the first rotation of workpiece W, curve A2 is the trajectory of tool 11 in the second rotation of workpiece W, and curve A3 is the trajectory of tool 11 in the third rotation of workpiece W. For the sake of simplicity, the trajectories of the tool 11 after the fourth rotation of the workpiece W are not shown.

In step S12 of FIG. 2, the oscillation command generation part 23 (refer to FIG. 6) in the control part 26 generates an oscillation command as follows. In the position command part 22, the position command (dashed lines C1, C2 and C3) of the feed axis M1 is determined-The oscillation command generation part 23 determines the oscillation frequency of the cosine wave-like oscillation command in order to generate commands like the curves A1, A2, and A3 with the dashed lines C1, C2 and C3 as references axes. The value obtained from the expression S/60×I of Formula (1), which is described later, corresponds to the oscillation frequency.

When determining the above-described oscillation frequency, as shown in FIG. 5, it is preferable that the initial phase of the cosine wave-like curve A2 using a predetermined dashed line, for example, dashed line C2, as a reference axis deviate by a half cycle from the cosine wave-like curve A1 using the preceding dashed line, for example, dashed line C1, as the reference axis. The reason for this is that when the period deviates by half, the oscillation amplitude of the oscillation command can be minimized, and as a result, swarf can be most efficiently shredded.

Then, the oscillation command generation part 23 determines the oscillation amplitude of the above-mentioned oscillation command in order to generate commands such as the curves A1, A2 and A3 using the dashed lines C1, C2 and C3 as reference axes. The value obtained from the expression K×F/2 in Formula (1), which will be described later, is the oscillation amplitude. Curve A1 and curve A2 shown in FIG. 5 overlap each other at portion B1, where the rotation angle is about 0 degrees, and portion B2, where the rotation angle is about 240 degrees. As can be seen from FIG. 5, the maximum values of curve A1 with respect to dashed line C1 are larger than the minimum values of curve A2 with respect to dashed line C2 at portions B1 and B2. In other words, the oscillation command generation part 23 preferably determines the oscillation amplitude so that the previous curve A1 and the succeeding curve A2 partially overlap each other. In curves A1, A2 and A3, since the feed speed is constant, the oscillation amplitude of each oscillation command is also the same.

At the overlapping portions B1 and B2, since the tool 11 separates from the workpiece W when the tool 11 is machining with the trajectory of curve A2, the workpiece W is not machined. In the present embodiment, since such overlapping portions are periodically generated, so-called intermittent cutting can be performed. In the example shown in FIG. 5, swarf is generated at each of portions B1 and B2 by the operation according to curve A2. Namely, in the second rotation curve A2, swarf is generated twice. Since such intermittent cutting is performed periodically, vibration cutting becomes possible.

Further, curve A3 formed with respect to dashed line C3 has the same shape as curve A1. Curve A2 and curve A3 overlap at portion B3 corresponding to a rotation angle of about 120 degrees and at portion B4 corresponding to a rotation angle of about 360 degrees. Swarf is generated at each of portions B3 and B4 by the operation according to curve A3. Namely, swarf is generated twice in the third rotation curve A3. Thereafter, swarf is generated twice for each rotation of the workpiece. However, no swarf is generated in the first rotation.

By setting the oscillation frequency and the oscillation amplitude in this manner, the oscillation command generation part 23 (refer to FIG. 6) in the control part 26 generates the oscillation command (step S12).

For example, the oscillation command is represented by the following formula.

$$\text{Oscillation command} = (K \times F/2) \times \cos(2\pi \times S/60 \times I \times t) - (K \times F/2) \qquad \text{Formula (1)}$$

In Formula (1), K is the oscillation amplitude magnification, F is the movement amount of the tool 11 per rotation of the workpiece W, i.e., the feed amount per rotation [mm/rev], S is the rotation speed [min$^{-1}$], or [rpm] around the center axis of workpiece W, and I is the oscillation frequency magnification. The aforementioned oscillation frequency corresponds to the expression S/60×I in Formula (1), and the aforementioned oscillation amplitude corresponds to the expression K×F/2 in Formula (1). The oscillation. amplitude magnification K is an integer of 1 or more, and the oscillation frequency magnification I is a non-integer larger than zero (for example, a positive non-integer such as 0.5, 0.8, 1.2, 1.5, 1.9, 2.3, or 2.5, . . . , etc.). The oscillation amplitude magnification K and the oscillation frequency magnification I are constant (in the example of FIG. 5, I is 1.5).

The reason why the oscillation frequency magnification I is not an integer is that in the case of an oscillation frequency which is exactly the same as the rotation number around the center axis of workpiece W, it is impossible to generate the overlapping portions B1, B2, B3, B4 and the like described above, and an effect of shredding swarf though oscillation cutting cannot be obtained.

Figure 7:
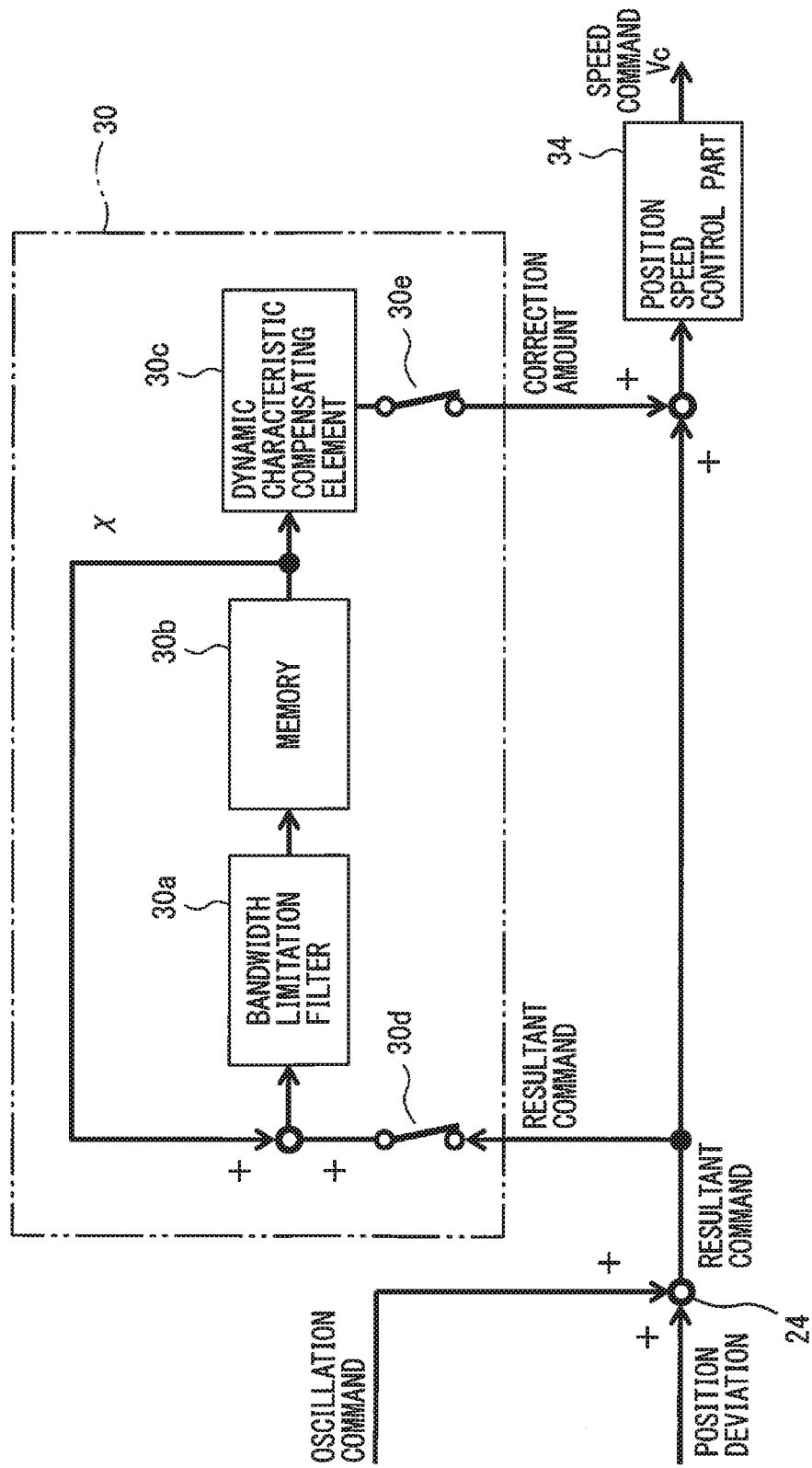
FIG. 7 is a block diagram showing a configuration example of the learning controller shown in FIG. 6.

Furthermore, according to Formula (1), the oscillation command is a command in which the expression (K×F/2) is subtracted as an offset value from the cosine waves using dashed lines C1, C2 and C3 as reference axes indicating the position command. Thus, the positional trajectory of the tool 11 based on the command value obtained by adding the oscillation command to the position command can be controlled with the position by the position command as the upper limit in the machining feed direction of the tool 11. Therefore, curves A1, A2, A3, etc., in FIG. 7 are such that the dashed lines C1, C2, C3, etc., are not exceeded in the positive Z axis direction (i.e., the machining feed direction of the tool 11).

Further, using an oscillation command as represented by Formula (1), large oscillation commands are not issued from the start in the feed direction of the tool 11 at the machining start point (0 degrees on the horizontal axis) of the tool 11, as can be seen from curve A1 in FIG. 5.

Note that, the initial value of each parameter (K and I in Formula (1)) adjusted when defining the oscillating frequency and the oscillating amplitude is stored in the machining conditions storage part 29 before the machine tool 10 is operated. The rotation speed (S) of the workpiece W is stored in advance as a machining condition in the machining conditions storage part 29. The feed amount per rotation F is obtained from the rotation speed (S) and the position command generated by the position command generation part 22.

Thereafter, in step S13, the control part 26 obtains the position deviation, which is the difference between the position command generated by the position command generation part 22 shown in FIG. 1 and the actual position of the feed axis M1, and adds the position deviation to the above oscillation command to obtain a resultant command.

Then, in step S14 of FIG. 2, the control part 26 controls the feed axis M1 based on the aforementioned resultant command. The spindle M0 is controlled by the control device 20 in accordance with the rotation speed (S) of the workpiece W stored in the machining conditions storage part 29. In the present embodiment, there is no need to generate a table of vibration cutting information in advance, and from the machining conditions of the workpiece W, it is possible to determine the shredding conditions of the workpiece W prior to actually cutting the workpiece W.

When there is backlash in the drive mechanism portion of the tool 11 or when the rigidity of the drive mechanism portion is low, if the control gain is set high in order to improve the responsiveness of the servo, vibration may occur and the positional accuracy of the tool 11 may not be stable. For example, even if the feed axis M1 is driven based on command values corresponding to curves A1, A2, A3, etc., the actual position of the tool 11 may not completely follow curves A1, A2, A3, etc., in some cases. In such a case, if the actual position of the tool 11 does not coincide with the command values, such as the curves A1, A2, A3 etc., at the overlapping portions B1, B2, B3, B4, etc., shown in FIG. 5, intermittent cutting will not occur and as a result, swarf cannot be satisfactorily formed.

Thus, in the present embodiment, learning control is used to improve compliance with the oscillation command, as shown in step S15 of FIG. 2. Learning control is a control method that improves compliance with a "periodic command with a predetermined repeated pattern", and the position deviation can be decreased as the cycle progresses from the first cycle to the second cycle, the second cycle to the third cycle, etc. Specifically, position deviations for a predetermined number of oscillation cycles of the workpiece W and the tool 11 are learned and set as correction amounts, thereby preventing an increase in periodic position deviation caused by the oscillation command.

As a result, the actual position of the tool 11 gradually approaches the command value curves A1, A2, A3, etc., and ultimately coincides with the command value curves A1, A2, A3, etc. In such a case, since the command value curves A1, A2, A3, etc., have overlapping portions B1, B2, B3, B4, etc., as described above, intermittent cutting can be reliably performed, and the swarf can be reliably shredded.

Furthermore, learning bandwidth for learning control has an upper limit, and when the oscillation frequency exceeds the upper limit, learning does not converge and position deviation remains. As a result, swarf is not satisfactorily formed. Therefore, in the present embodiment, it is necessary to obtain an optimum oscillation frequency within a range where learning control can be performed.

Specifically, similarly to a torque reduction method, the oscillation frequency of the oscillation command can be kept low by adjusting (lengthening) the length of the swarf, as described later, and the learning bandwidth can be accommodated. Of course, if modification of machining conditions is possible, the rotation speed of the spindle M0 (i.e., the rotation speed of workpiece W) may be reduced.

Furthermore, in the oscillation cutting of the present embodiment, since the optimum oscillation frequency and oscillation amplitude are obtained, the required torque can be minimized. However, even if the required torque can be minimized, torque saturation can occur, which must be prevented. Further, when learning control is applied, the torque increases and torque saturation becomes more likely to occur. Thus, in the present embodiment, it is necessary to obtain an optimum oscillation frequency and oscillation amplitude within a range which will not cause torque saturation.

The oscillation amplitude is preferably as small as possible so that, when the oscillation frequency is low, longer swarf is formed. At such a time, the torque required for the feed axes M1, M2, etc., can be small. Conversely, when the oscillation amplitude is large, the torque required for the feed axes M1, M2, etc., also increases. When the oscillation frequency is high, the length of the swarf becomes short, and the torque required for the feed axes M1, M2, etc., also increases.

When an operator requires swarf of a desired length, the operator can enter the desired length of the swarf into the oscillation command generation part 23. As a result, the oscillation command generation part 23 generates the oscillation frequency and the oscillation amplitude based on the desired swarf length. For example, when short swarf is requested, damage to the workpiece W can be prevented, and when long swarf is requested, the load on the tool 11 can be reduced by suppressing the torque and learning bandwidth, allowing for learning to more easily converge.

Figure 6:
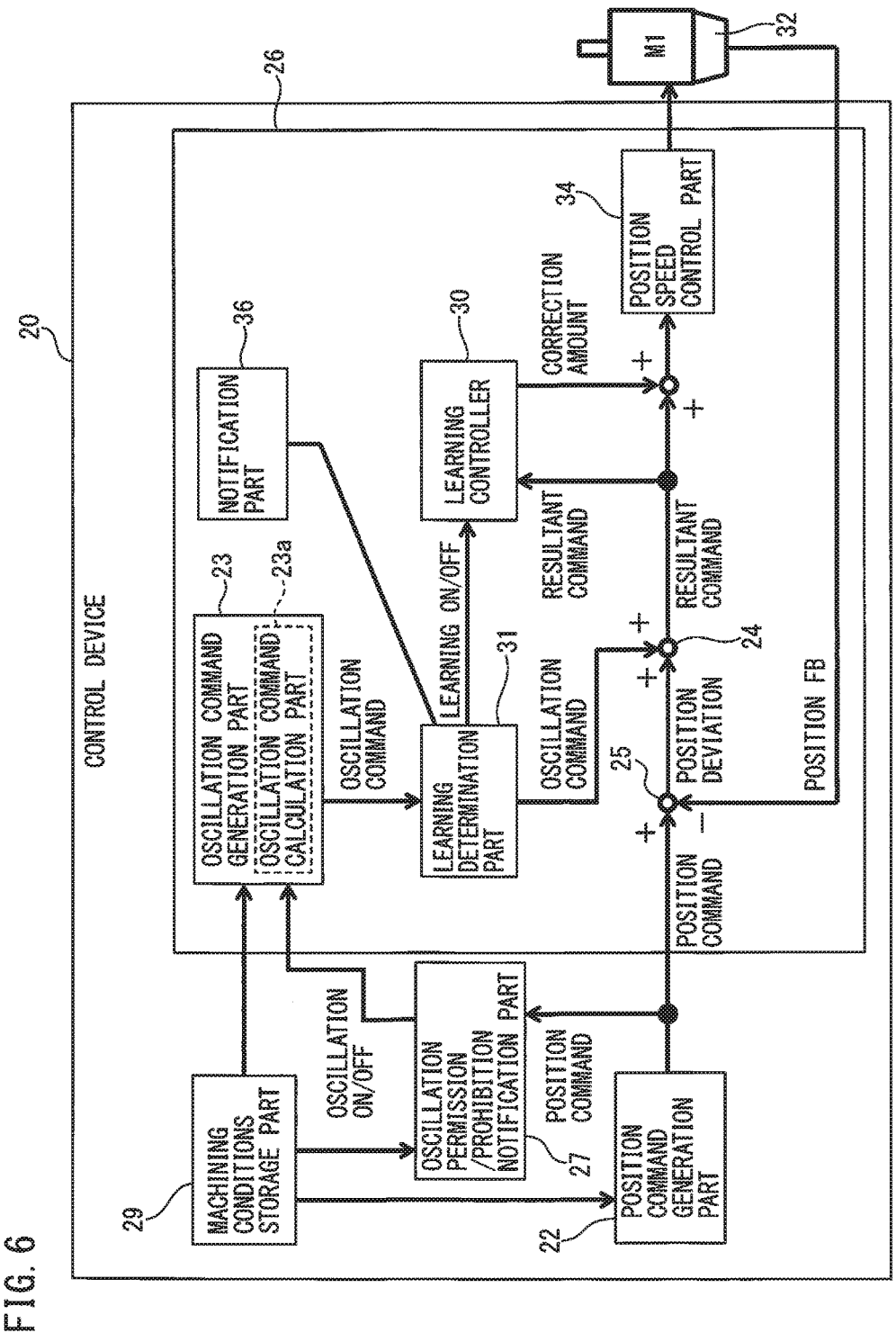
FIG. 6 is a block diagram showing a specific example of a control device having a learning control function.

FIG. 6 is a block diagram showing a specific example of the control device 20 having the learning control function as described above.

The control device 20 shown in FIG. 6 includes the machining conditions storage part 29, the position command generation part 22, the control part 26 (feed axis control part), and the oscillation permission/prohibition notification part 27. The machining conditions storage part 29, the position command generation part 22 and the oscillation permission/prohibition notification part 27 may be provided in a host computer (not shown), such as an NC device connected to the control device 20.

The control device 26 includes the oscillation command generation part 23, an addition part 24, a subtraction part 25, a learning controller 30, a learning determination part 31, a position speed control part 34, and a notification part 36. Further, the oscillation command generation part 23 has an oscillation command calculation part 23a for calculating an oscillation command using the above-described Formula (1). The feed axis M1 for moving the tool 11 in the machining feed direction is equipped with an encoder 32 for detecting the rotational position of the feed axis M1.

The position command generation part 22 shown in FIG. 6 generates a position command instructing the feed axis M1 of the position of the tool 11 in the machining feed direction based on the rotation speed of the workpiece W and the feed speed of the tool 11 stored in the machining conditions storage part 29, and transmits the position command to the subtraction part 25 at predetermined time intervals. The above predetermined time intervals may be the control period (sampling period) of the control part 26, or may be some another period.

The subtraction part 25 calculates the position deviation, which is the difference between the position command transmitted from the position command generation part 22 and the position feedback value (position FB) output from the encoder 32 of the feed axis M1, and transmits the position deviation to the addition part 24.

Further, the oscillation command generation part 23 generates an oscillation command based on the above-described Formula (1), and transmits the oscillation command to the addition part 24 at the above predetermined time intervals. The oscillation command is calculated by the oscillation command calculation part 23a in the oscillation command generation part 23. Specifically, the oscillation command calculation part 23a acquires the rotation speed (S) of the workpiece W stored in the machining conditions storage part 29 and the position command of the feed axis M1 generated by the position command generation part 22, and obtains the feed amount (F) of the tool 11 per rotation from the position command and the rotation speed (S). The oscillation command calculation part 23a calculates the oscillation frequency and the oscillation amplitude of the oscillation command according to the above Formula (1) based on the feed amount (F) of the tool 11 per rotation, the rotation speed (S) of workpiece W, and the like. The oscillation command calculation part 23a generates an oscillation command based on the calculated oscillation frequency and oscillation amplitude and the elapsed time t from the start of oscillation cutting.

The addition part 24 adds the position deviation output from the subtraction part 25 to the oscillation command. At such a time, the position deviation and the oscillation command are input to the addition part 24 simultaneously with each other at the above-mentioned predetermined intervals and are added together. The addition part 24 transmits the resultant command (position command value) obtained by adding the position deviation to the oscillation command, to the position speed control part 34.

The position speed control part 34 generates a speed command and a torque command based on the resultant command and supplies the speed command and torque command to the feed axis M1. The feed axis M1 is controlled based on such commands. When the feed axis M1 rotates, the actual position of the feed axis M1 is fed back to the subtraction part 25 from the encoder 32 mounted on the feed axis M1. If there is no difference between the position command value and the position feedback value based on the resultant command, it means that the actual position of the feed axis M1 has arrived at the command position.

The above resultant command is input to the learning controller 30. The learning controller 30 repeatedly calculates the correction amount based on the oscillation phase obtained from the oscillation command and the resultant command and corrects the resultant command to improve compliance with the periodic operation.

The learning control is a control that improves compliance with the periodic command by correcting the movement command by integrating the deviation up to the prior learning period.

FIG. 7 is a block diagram showing a configuration example of the learning controller 30 shown in FIG. 6.

The resultant command output from the addition part 24 at the above-mentioned predetermined time intervals is input to the learning controller 30. Though the resultant command is input to the learning controller 30, since the resultant command contains the difference between the position command and the position feedback value, it is generally the same as the position deviation input to the learning controller. In the learning controller 30, data regarding one cycle of oscillation (one learning cycle) is stored in the memory 30b for each phase. Each phase is obtained by converting the cycle obtained from the oscillation frequency of the oscillation command into the cycle at the rotation angle and dividing the cycle at the rotation angle by a predetermined number of divisions (referred to as oscillation phase). The learning controller 30 obtains the deviation at each phase stored in the memory 30b from the oscillation phase obtained from the oscillation command and the inputted resultant.

command (deviation), and adds it to the data of each phase stored in the memory 30b. By such a series of processes, it is possible to iteratively obtain the integrated deviation at each phase.

The integrated deviation stored in the memory 30b is compensated by the dynamic characteristic compensating element 30c for the phase delay of the to-be-controlled object and is a correction amount according to the time for each control cycle of the control part 26. This correction amount is added as a correction amount to the resultant command immediately before being input to the position speed control part 34. The position speed control part 34 generates and outputs the speed command Vc based on the resultant command after the correction amount has been added.

As described above, since the learning controller 30 repeatedly obtains the integrated deviation at each phase and adds the correction amount the delay of the to-be-controlled object of which has been compensated by the dynamic characteristic compensating element 30c to the resultant command, it is possible to converge the resultant command (deviation) input to the learning controller 30 to zero while repeating periodic operations, such as oscillating the tool 11 at a constant cycle many times. In short, the tool 11 can be oscillated in accordance with the oscillation command.

Thus, for example, even if it is difficult to improve the response of the servo due to the existence of backlash in the drive mechanism of the tool 11 or due to the low rigidity of the drive mechanism, more accurate oscillation cutting becomes possible, and the swarf can be reliably shredded. Note that, in the embodiment of the learning control described above, learning is performed to obtain a correction amount for the resultant command for each oscillation period using a single oscillation period as the learning period. However, in the present invention, rather than a single oscillation period, a predetermined number of oscillation periods may be set as the learning period.

Like the workpiece W shown in FIG. 1, workpieces which are formed such that a projection 35 and a corner part 35a are provided on at least a part of the outer surface of the workpiece and in which the projection 35 exists on the front side of the tool 11 in the machining feed direction can also be subjected to oscillation cutting. In this case, though the outer surface of the workpiece W is subjected to oscillation cutting, since it is necessary to prevent the tool 11 from interfering with the projection 35, positional accuracy with respect to the machining end point in the machining feed direction of the tool 11 is critical. If the tool exceeds the machining end point, the projection 35 will be cut by the tool 11, bringing about the so-called "overshoot" problem. The workpieces for which this problem occurs are not limited to workpieces shaped as in FIG. 1. Workpieces for which this problem occurs are workpieces which are rotationally symmetric about the center axis thereof, and have a corner part 35a which is not continuous with the radially outermost part radially inward of the radially outermost part of the workpiece in a cross-section along the central axis thereof. For example, the workpieces W shown in. FIGS. 1, 4A and 4B. Furthermore, the above corner part 35a also encompasses portions having a predetermined curvature or tapered portions.

Such a problem of overshoot with respect to the workpiece W can occur even if learning control is applied to oscillation cutting as described above. This is because learning control is a control to apply the correction amount in the repetition of the periodic pattern one learning period prior to the command value. Even if a position command value so that the tool 11 does not exceed the machining end point is outputted to the control part 26 (FIG. 6) of the control device 20 as the resultant command, a correction amount in the oscillation pattern one learning period prior is applied to the position command value, such that overshoot cannot be prevented.

The control device 20 of the present embodiment has a function to deactivate the learning controller 30 from a time prior to the point where the tool 11 reaches the machining end point (i.e., the final stop position of the tool 11) on the workpiece in the machining feed direction.

Specifically, a machining program including information on movement of the workpiece W and the tool 11 (for example, the rotation speed of the workpiece W, the position, trajectory, and velocity of the tool 11, the machining end point of the workpiece W, etc.) is stored in the machining conditions storage part 29. The machining conditions storage part 29 may be included in a host computer (not shown) which is connected to the control device 20.

The oscillation permission/prohibition notification part 27 shown in FIG. 6 notifies the oscillation command generation part 23 of generation permission of the oscillation command when the aforementioned position command value has not reached within a predetermined range of the machining end point of the workpiece W. Conversely, when position command value has reached within the predetermined range, the oscillation command generation part 23 is notified of generation prohibition of the oscillation command.

More specifically, the oscillation permission/prohibition notification part 27 calculates a distance or time between the position command value and the machining end point from the position command value obtained by the position command generation part 22 based on the machining program stored in the machining conditions storage part 29 and the machining end point obtained from the machining program. It is preferable that the oscillation permission/prohibition notification part 27 determine whether or not the position command value has reached within a predetermined range of the machining end by determining whether or not the distance or time calculated in this manner is equal to or less than a predetermined threshold value. Regarding the above-described predetermined threshold value, a threshold value which prevents cuts in the workpiece W due to overshoot can be determined by experimentation, simulation, etc., in advance.

Further, the learning determination part 31 determines whether generation permission or generation prohibition of the oscillation command has been notified to the oscillation command generation part 23. The learning determination part 31 turns on learning control using the learning controller 30 when notification of generation permission of the oscillation command has been received. Conversely, the learning determination part 31 sets the oscillation command to zero and turns off learning control using the learning controller 30 when notification of generation prohibition of the oscillation command has been notified. By providing such a learning determination part 31, the occurrence of the overshoot described above can be prevented. In FIG. 6, the signal line from the encoder 32 to the learning determination part 31 is omitted.

Any method may be used as the method for turning off the above-described learning control. As shown in FIG. 7, a first switch 30d is provided on the input line for inputting the resultant command output from the addition part 24 to the learning controller 30, and a second switch 30e is provided on the output line for outputting the correction value from the dynamic characteristic compensation element 30c. For example, the learning controller 30 may be configured to turn off the first switch 30d and erase the accumulated deviation for one learning period stored in the memory 30b upon receiving an instruction to turn off learning control from the learning determination part 31.

Alternatively, the learning controller 30 may be configured to turn off the first switch 30d and the second switch 30e simultaneously upon receiving an instruction to turn off the learning control from the learning determination part 31. As a result of this configuration, even if the learning controller 30 is turned off, it is possible to preserve the integrated deviation for one cycle of learning stored in the memory 30b. Of course, the above-described method for turning off the learning control is merely an example, and the present invention is not limited thereto.

Figure 8A:
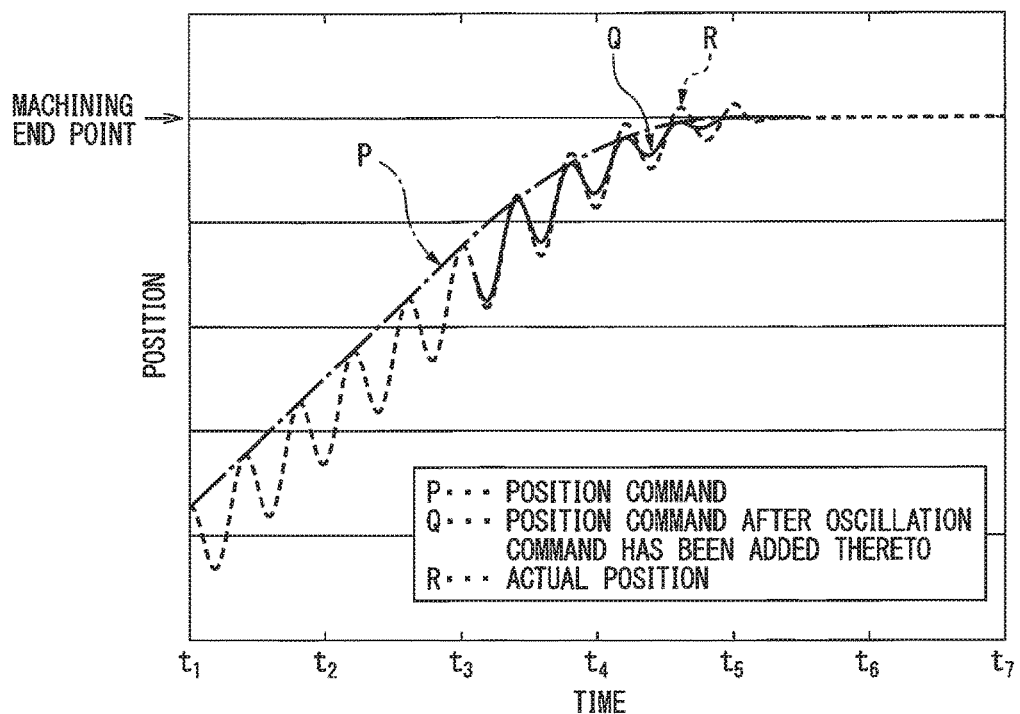
FIG. 8A is a drawing showing the actual behavior of the tool near the machining end point in the case where the control part of the control device shown in FIG. 6 does not have a learning determination part.
Figure 8B:
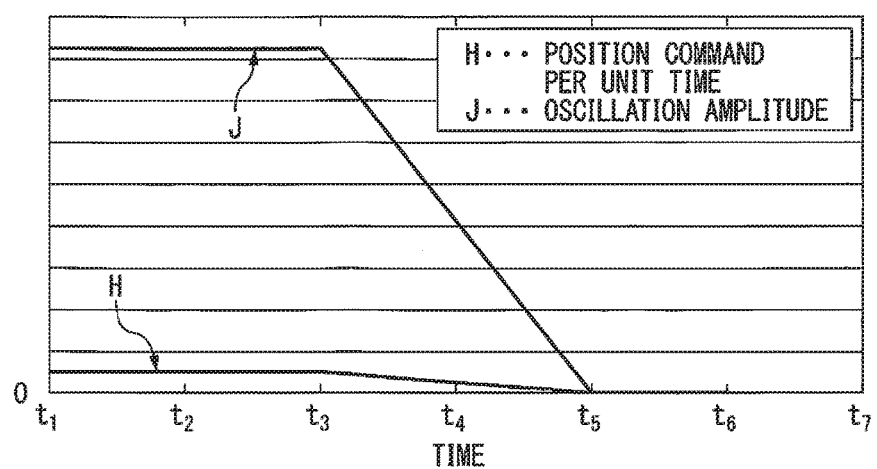
FIG. 8B is a drawing showing the time change of the position command and the time variation of the oscillation amplitude per unit time, corresponding to FIG. 8A.

FIG. 8A is a drawing showing the actual behavior of the tool 11 near the machining end point in the case where the control part 26 of the control device 20 shown in FIG. 6 does not have a learning determination part 31, In FIG. 8A, the positive direction of the vertical axis corresponds to the machining feed direction of the tool 11, curve P represents the time change of only the position command, curve Q represents the time change of the position command after the oscillation command has been added thereto, and curve R represents the time change of the actual position of the tool 11. In FIG. 8A, in order to clearly show the change of the curve R, curve Q between time $t_1$ and time $t_3$ has been omitted, but curve Q and curve R actually overlap each other. Furthermore, FIG. 8B is a drawing corresponding to FIG. 8A. Polygonal line H represents the time change in the position command per unit time (i.e., the feed speed of tool 11) corresponding to the position command indicated by curve P in FIG. 8A, and polygonal line J represents the time variation of the oscillation amplitude.

For example, as shown in FIG. 8B, the feed speed of the tool 11 gradually decreases from time $t_3$, and at time $t_5$, the tool 11 stops at the predetermined machining end point (refer to the polygonal line H). When the feed speed is gradually decreased in this manner, the feed amount F per rotation decreases, and accordingly, the oscillation amplitude (=K×F/2) also gradually decreases, becoming zero at time $t_5$ (refer to the polygonal line J). Furthermore, as the oscillation amplitude gradually decreases, the oscillation command obtained from Formula (1) also gradually decreases. Thus, as shown in FIG. 8A, regarding curve Q of the position command after the oscillation command has been added thereto, the amplitude of the periodic wavy line forming curve Q decreases from time $t_3$, and the amplitude of the wavy line disappears at time $t_5$ at which the oscillation amplitude becomes zero.

Conversely, in the example of FIG. 8A, since the control part 26 of the control device 20 shown in FIG. 6 does not include a learning determination part 31, learning control is carried out. As a result, even if the amplitude of the periodic wavy line forming the curve Q periodically decreases from time $t_3$ to time $t_5$ as described above, learning control for correcting the resultant command at the present time is continued using the correction amount obtained for the resultant command one cycle prior. As a result, as can be understood from FIG. 8A, after time $t_3$, curve R of the actual position does not coincide with curve Q of the position command after the oscillation command has been added thereto. More specifically, as the time elapses from time $t_3$ to time $t_5$, the amplitude of the wavy line forming curve R of the actual position becomes larger than the amplitude of the wavy line forming curve Q, and curve R of actual position exceeds the machining end point in the machining feed direction. So-called "overshoot" occurs.

Figure 9A:
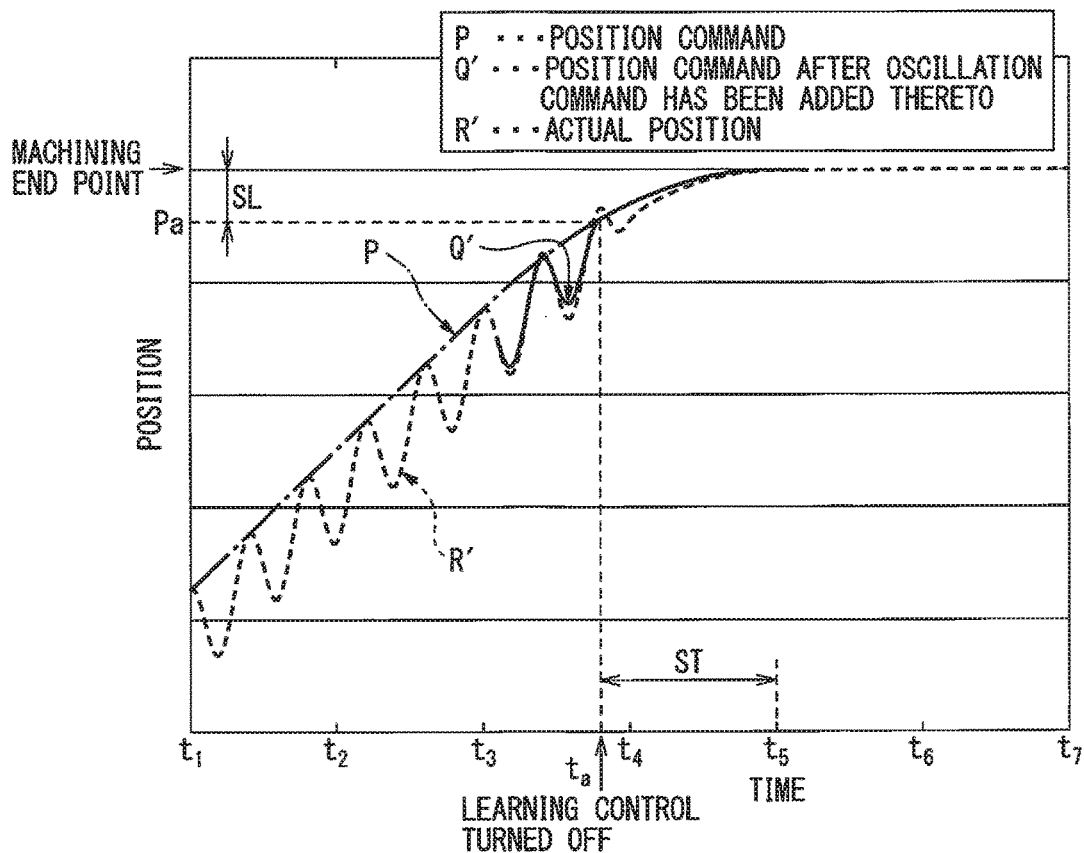
FIG. 9A is a drawing showing the actual behavior of the tool near the machining end point in the case of a control device (FIG. 6) having a learning determination part.

In contrast thereto, FIG. 9A is a drawing showing the actual behavior of the tool 11 near the machining end point in the case of the control device 20 shown in FIG. 6, i.e., a control device 20 having a learning determination part 31. In FIG. 9A, curve P represents the time change of only the position command (i.e., the same as curve P in FIG. 8A), curve Q' represents the time change of the position command after the oscillation command has been added thereto, and curve R' represents the time change of the actual position of the tool 11. Also in FIG. 9A, in order to clearly show the change of curve R', curve Q' from time $t_1$ to time $t_3$ is omitted, but, curve Q' and curve R' actually overlap each other. Furthermore FIG. 9B is a drawing which corresponds to FIG. 9A, and in this drawing, polygonal line H represents the time change of the position command per unit time (i.e., the same as polygonal line H in FIG. 8B), and curve J' represents the time change of the oscillation amplitude.

Figure 9B:
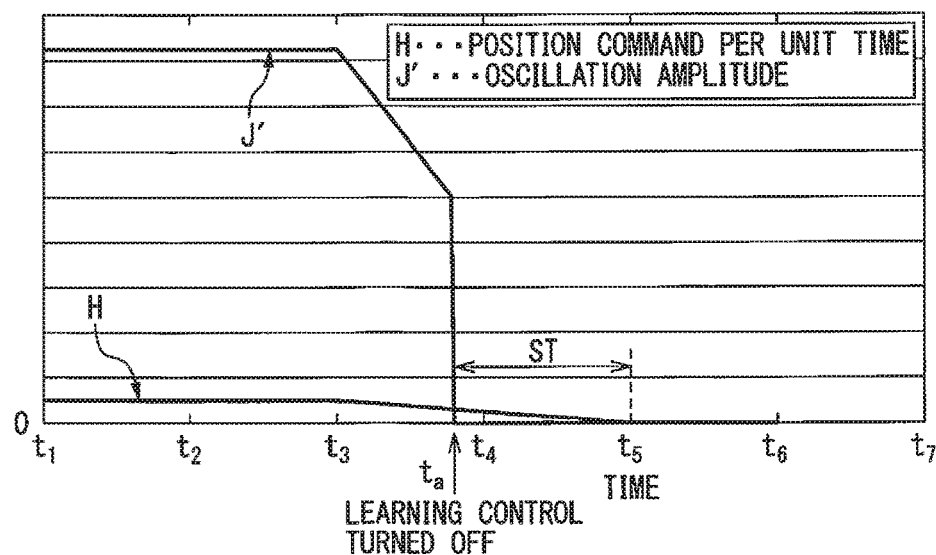
FIG. 9B is a drawing showing the time change of the position command and the time variation of the oscillation amplitude per unit time, corresponding to FIG. 9A.

As shown in FIG. 9B, by gradually decreasing the feed speed of the tool 11 from time $t_3$ (refer to polygonal line H), the oscillation amplitude gradually decreases (refer to polygonal line J'). This is the same as curve J in FIG. 8B. Compared to the examples of FIG. 8A and 8B, in the examples of FIG. 9A and FIG. 9B, the above learning control is terminated (learning control is turned off) when the value Pa of the position command reaches within a predetermined range (the distance SL or time ST shown in FIG. 9A) near the machining end point. Further, when the value of the position command reaches within the predetermined range near the machining end point, the oscillation command is set to zero. Specifically, the oscillation permission/prohibition notification part 27 shown in FIG. 6 calculates the distance or time between the position command value and the machining end point based on the machining program, and when this distance or time is equal to or less than a predetermined threshold. (the distance SL or time ST shown in FIG. 9A), the oscillation command generation part 23 is notified of generation prohibition of the oscillation command. Due to this notification, the oscillation command generation part 23 will not output an oscillation command. When it is determined that generation prohibition of the oscillation command has been notified to the oscillation command generation part 23, the learning determination part 31 sets the oscillation command to zero, and issues an instruction to the learning controller 30 to turn off the learning control, whereby the learning controller 30 is stopped.

As a result, as shown in FIG. 9A, when the learning control is turned off (i.e., at the time to corresponding to value Pa of the position command) or later, since the oscillation command is not added to the position command, and learning control is not performed, the curve Q' of the position command after the oscillation command has been added thereto becomes coincident with the curve P of the position command. Accordingly, the amplitude of the periodic wavy line forming curve R' rapidly decreases such that curve R' of the actual position also follows curve P of the position command. By appropriately setting the above-mentioned predetermined threshold (the distance SL or time ST), as shown in FIGS. 9A and 9B, curve R of the actual position does not exceed the machining end point in the machining feed direction. The occurrence of so-called overshoot can be prevented.

FIG. 10 is a flowchart showing an example of the operations of the control device shown in FIG. 6.

First, in step S21, the control device 20 determines the presence or absence of an oscillation cutting start command. When an oscillation cutting start command has been received, oscillation cutting is started, and when such a command has not been received, machining of the workpiece W ends.

When oscillation cutting has started, the position command generation part 22 shown in FIG. 6 generates a position command for the feed axis M1 based on the machining conditions described in the machine program in the machining conditions storage part 29, e.g., the rotation speed of the workpiece W or the feed speed of the tool 11 and sends the position command to the control part 26. Subsequently, the oscillation permission/prohibition notification part 27 obtains the position command for the feed axis M1 (step S22). At this time, the oscillation permission/prohibition notification part 27 may obtain the actual position of the feed axis M1 moved in accordance with the position command from the encoder 32.

Then, in step S23, the oscillation permission/prohibition notification part 27 reads the machining end point stored in advance in the machining conditions storage part 29, and calculates the distance between the above-described position command value and the machining end point. Further, the oscillation permission/prohibition notification part 27 determines whether or not the distance calculated as described above is equal to or less than a predetermined first threshold (e.g., the distance SL shown in FIG. 9A) in order to determine whether or not the position command reaches within the predetermined range in the vicinity of the machining end point. As a result, when the calculated distance is equal to or less than the predetermined first threshold value, i.e., when the value of the position command approaches the machining end point, the oscillation permission/prohibition notification part 27 notifies the oscillation command generation part 23 of generation prohibition of the oscillation command (step S24).

Next, in step S25, the oscillation command generation part 23 determines whether or not notification of generation prohibition of the oscillation command has been received. When notification of generation prohibition of the oscillation command has been received, the oscillation command generation part 23 does not generate an oscillation command. In other words, the oscillation command generation part 23 sets the oscillation command to zero until notification of generation prohibition of the oscillation command ends.

In this case, the learning determination part 31 sets the oscillation command to zero and turns off learning control using the learning controller 30 until notification of generation prohibition of the oscillation command ends. Furthermore, since the oscillation permission/prohibition notification part 27 notifies the oscillation command generation part 23 of generation permission of the oscillation command, a configuration in which the learning controller 30 sets the oscillation command to zero and turns off learning control while notification of generation permission of the oscillation command is not received may also be used.

Conversely, when it is determined that the notification of generation prohibition of the oscillation command has not been received in the above step S25, the processing of the next step S26 is performed. In step S26, the oscillation command calculation part 23a of the oscillation command generation part 23 calculates the oscillation command based on the rotation speed of the workpiece W read from the machining conditions storage part 29 and the position command obtained from the aforementioned position command generation part 22. This oscillation command is sent to the addition part 24.

Next, in step S27, the addition part 24 generates a resultant command by adding the position deviation, which is the difference between the position command obtained from the position command generation part 22 and the actual position of the feed axis M1 (position FB), to the above-mentioned oscillation command.

Next, in step S28, the learning controller 30 performs learning control in which the correction amount of the resultant command is obtained based on the oscillation phase obtained from the above-mentioned oscillation command and the above-mentioned resultant command, and adds the correction amount to the above-mentioned resultant command.

Next, in step S29, the presence or absence of a command to end oscillation cutting is determined. When a command to end oscillation cutting has been output, machining of the workpiece W ends. Conversely, when a command to end oscillation cutting has not been received, the series of processes of step S22 to step S29 is repeated.

The operation flow described above is merely an example, and the present invention is not limited thereto. For example, in step S23, the oscillation permission/prohibition notification part 27 may calculate, instead of a distance, the time from the position command value to the machining end point. The oscillation permission/prohibition notification part 27 may determine whether the position command has reached within the predetermined range of the machining end point by determining whether the time is equal to or less than a predetermined second threshold value (e.g., the time ST shown in FIG. 9A).

Note that, in the learning determination part 31 described above, the timing at which the learning control is turned off may be the timing at which the oscillation command output from the oscillation command generation part 23 becomes zero. Such timing is when the position command to which the oscillation command has been added matches the original position command, like the portion of the curve Q' at the time to shown in FIG. 9A. In the case of FIG. 5, this corresponds to the phase of 0°, 120°, 240°, and 360°. According to the above timing, while the tool 11 is being moved in accordance with the position command after the oscillation command has been added thereto, it is possible to prevent the movement of the tool 11 from being instantaneously switched largely to the movement in accordance with only the position command. Therefore, it is not necessary to apply a sudden load to the motor.

Further, like the examples shown in FIGS. 3 and 4B, even if the tool 11 is oscillated using a plurality of axes such as the feed axes M1, M2, etc. (e.g., taper machining), it is preferable to synchronize the timing of turning off the learning control and the timing of zeroing the oscillation command for all of the axes.

For example, when performing taper machining as shown in FIGS. 3 and 4B, control parts 26 are provided for the respective feed axes M1 and M2. In such a case, as shown in FIG. 6, each of the control parts 26 of each of the feed axes M1 and M2 includes an oscillation command generation part 23, an addition part 24, a subtraction part 25, a learning controller 30, a learning determination part 31, a position speed control part 34, and a notification part 36. Furthermore, as shown in FIG. 6, the notification part 36 is provided in the learning determination part 31 of the control part 26 of the feed axis M1, and the learning determination part 31 notifies the determination result of the learning determination part 31 to the learning determination part 31 of the control part 26 of the other feed axis M2 (refer to FIG. 3) using the notification part 36.

Through the use of such a notification function, with regard to the control part 26 of one feed axis among the plurality of feed axes which cooperate to perform oscillation cutting, when the learning determination part 31 turns off the learning control in accordance with the notification of generation prohibition of the oscillation command to the oscillation command generation part 23, it is possible to turn off the learning control and set the oscillation command to zero for the control parts 26 of all other feed axes.

In other words, when a control part 26 is provided for each of a plurality of feed axes, it is preferable for the learning determination part 31 of the control part 26 for each feed axis to use at least one of the self-determination to turn off learning control and the determination to turn off learning control notified from the learning determination part 31 of another control part 26 to turn off the learning control and set the oscillation command to zero.

Although the present invention has been described with reference to representative embodiments, a person skilled in the art can understand that the above-described modifications of the embodiments and various other modifications, omissions, and additions can be made without departing from the scope of the present invention.

Furthermore, in order to solve the at least one problem of the present disclosure, various embodiments and the effects thereof, as described below, can be provided.

The first aspect of the present disclosure provides a control device (20) for controlling a machine tool (10) for cutting an outer peripheral surface or an inner peripheral surface of a workpiece (W) with a tool (11), the machine tool having a spindle (M0) for performing a relative rotation between the workpiece (W) and the tool (11) around a central axis of the workpiece, and at least one feed axis (M1, M2) for performing a relative feeding between the tool (11) and the workpiece (W) along a generatrix of the outer peripheral surface or the inner peripheral surface of the workpiece (W), the control device comprising:

a position command generation part (22) for generating a position command for the at least one feed axis (M1, M2) based on a relative rotation speed of the workpiece (W) and the tool (11) and a relative feed speed of the tool (11) and the workpiece (W); and a feed axis control part (26) that controls the at least one feed axis according to the position command, wherein the feed axis control part (26) includes an oscillation command generation part (23) that generates an oscillation command for the at least one feed axis (M1, M2) based on the rotation speed and the position command such that the tool (11) intermittently cuts the workpiece (W) at an oscillation frequency which is a positive non-integral multiple of the rotation speed, and the feed axis control part is configured to control the at least one feed axis (M1, M2) based on a resultant command obtained by adding the oscillation command to a position deviation, which is a difference between the position command and an actual position of the at least one feed axis (M1, M2);

the control device (20) further comprising an oscillation permission/prohibition notification part (27) which notifies the oscillation command generation part (23) of generation permission of the oscillation command when the value of the position command is not within a predetermined range from the machining stop point of the workpiece (W) which has been stored in the control device (20) in advance, and which notifies the oscillation command generation part (27) of generation prohibition of the oscillation command when the value of the position command is within the predetermined range; wherein the feed axis control part (26) further comprises:

a learning controller (30) which performs learning control to obtain a correction amount of the resultant command based on an oscillation phase obtained from the oscillation command and the resultant command and which adds the correction amount to the resultant command; and a determination part (31) which determines whether the oscillation command generation part (23) has been notified of generation permission or generation prohibition of the oscillation command, and in the determination, when notification of generation permission of the oscillation command has been received, the learning control is turned on, and when notification of generation prohibition of the oscillation command has been received, the oscillation command is set to zero and the learning control is turned off.

The second aspect of the present disclosure provides the control device (20) of the above first aspect, wherein the oscillation permission/prohibition notification part (27) has a function to calculate a distance or time between the value of the position command and the machining stop point stored in the control device (20) in advance, and to determine whether or not the value of the position command is within the predetermined range in the vicinity of the machining stop point by determining whether the distance or the time is not more than a predetermined threshold.

According to the above first aspect and the second aspect, even if learning control, which decreases the oscillation amplitude approaching the machining end point, is applied to the oscillation cutting, since the learning control is turned off when the position command value has reached within a predetermined range in the vicinity of the machining end point, the occurrence of overshoot can be prevented.

The third aspect of the present disclosure provides the control device (20) of the above first aspect or second aspect, wherein the timing at which the learning control in the determination part (31) is turned off is the timing at which the oscillation command becomes zero.

According to the above third aspect, while moving the tool with the position command after the oscillation command has been added thereto, since it is possible to prevent the tool from being switched largely to the movement of the tool only by the position command very instantaneously, a sudden load is not applied to the motor.

The fourth aspect of the present disclosure provides the control device (20) of any of the above first aspect through the third aspect, wherein the feed axis control part (26) is provided for each of a plurality of feed axes (M1, M2), and the determination part (31) of each feed axis control part (26) notifies all of the notification parts of the feed axis control parts (26) when it determines to turn off the learning control, and the determination part (31) of each feed axis control part (26) sets the oscillation command to zero and turns off the learning control using at least one of a self-determination of turning off the learning control and the determination to turn off the learning control received from the determination part (31) of another feed axis control part (26).

According to the above fourth aspect, even when performing oscillation cutting using a plurality of feed axes, like in taper machining, the same overshoot prevention effect as in the first aspect can be obtained.

The fifth aspect of the present disclosure provides the control part (20) of any of the above first aspect through the fourth aspect, wherein the oscillation command generation part (23) generates the oscillation command by subtracting the oscillation amplitude from a reference axis of a cosine wave as an offset value.

According to the above fifth aspect, it is possible to control the position of the tool based on the command value after the oscillation command has been added to the position command with the position command, which is the target position of the tool in the machining feed direction, being the upper limit.

The sixth aspect of the present disclosure provides the control device (20) of any of the above first aspect through the fifth aspect, wherein the oscillation command generation part (23) generates an oscillation frequency of the oscillation command such that the workpiece (W) or the tool (11) is shifted by a half-cycle each time the workpiece or the tool makes one revolution based on the rotation speed, and generates an oscillation amplitude of the oscillation command based on the rotation speed and the position command.

According to the above sixth aspect, since the oscillation frequency of the oscillation command is shifted by a half-cycle each time the workpiece or the tool makes one revolution, the oscillation amplitude can be minimized. As a result, intermittent cutting can be efficiently performed.

The seventh aspect of the present disclosure provides the control device (20) of any of the above first aspect through the sixth aspect, wherein the oscillation command generation part (23) generates the oscillation frequency and the oscillation amplitude of the oscillation command such that the torque of the at least one feed axis (M1, M2) does not exceed a predetermined value.

According to the above seventh aspect, when the feed axis is driven based on the position command after the oscillation command has been added thereto, motor torque saturation can be prevented.

The eighth aspect of the present disclosure provides the control device (20) of any of the above first aspect through the seventh aspect, wherein the oscillation command generation part (23) generates the oscillation frequency and the oscillation amplitude based on a control bandwidth of the learning control so that learning converges.

According to the above eighth aspect, a more suitable oscillation command can be obtained.

The ninth aspect of the present disclosure provides the control device (20) of any of the above first aspect through the eighth aspect, wherein the oscillation command generation part (23) generates the oscillation frequency and the oscillation amplitude based on a desired length of swarf generated by the tool (11) processing the workpiece (W).

According to the above ninth aspect, when short swarf is requested, damage to the workpiece can be prevented. When long swarf is requested, it is possible to suppress the torque and reduce the load on the tool.

The tenth aspect of the present disclosure provides the control device (20) according to any of the above first aspect through the ninth aspect, wherein the workpiece (W) comprises a corner part (35a) which is not continuous with the radially outermost portion of the workpiece on the side which is more radially inwards than the radially outermost part in a cross-section along the central axis thereof.

The invention claimed is:

1. A control device for controlling a machine tool for cutting an outer peripheral surface or an inner peripheral surface of a workpiece with a tool, the machine tool having a spindle for performing a relative rotation between the workpiece and the tool around a central axis of the workpiece, and at least one feed axis for performing a relative feeding between the tool and the workpiece along a generatrix of the outer peripheral surface or the inner peripheral surface of the workpiece, the control device comprising:
   a position command generation part for generating a position command for the at least one feed axis based on a relative rotation speed of the workpiece and the tool and a relative feed speed of the tool and the workpiece; and
   a feed axis control part that controls the at least one feed axis according to the position command, wherein
   the feed axis control part includes an oscillation command generation part that generates an oscillation command for the at least one feed axis based on the rotation speed and the position command such that the tool intermittently cuts the workpiece at an oscillation frequency which is a positive non-integral multiple of the rotation speed, and the feed axis control part is configured to control the at least one feed axis based on a resultant command obtained by adding the oscillation command to a position deviation, which is a difference between the position command and an actual position of the at least one feed axis;
   the control device further comprising an oscillation permission/prohibition notification part which notifies the oscillation command generation part of generation permission of the oscillation command when the value of the position command is not within a predetermined range from the machining stop point of the workpiece which has been stored in the control device in advance, and which notifies the oscillation command generation part of generation prohibition of the oscillation command when the value of the position command is within the predetermined range; wherein
   the feed axis control part further comprises:
   a learning controller which performs learning control to obtain a correction amount of the resultant command based on an oscillation phase obtained from the oscillation command and the resultant command and which adds the correction amount to the resultant command; and
   a determination part which determines whether the oscillation command generation part has been notified of generation permission or generation prohibition of the oscillation command, and in the determination, when notification of generation permission of the oscillation command has been received, the learning control is turned on, and when notification of generation prohibition of the oscillation command has been received, the oscillation command is set to zero and the learning control is turned off.

2. The control device according to claim 1, wherein the oscillation permission/prohibition notification part has a function to calculate a distance or time between the value of the position command and the machining stop point stored in the control device in advance, and to determine whether or not the value of the position command is within the predetermined range in the vicinity of the machining stop point by determining whether the distance or the time is not more than a predetermined threshold.

3. The control device according to claim 1, wherein the timing at which the learning control in the determination part is turned off is the time at which the oscillation command becomes zero.

4. The control device according to claim 1, wherein the feed axis control part is provided for each of a plurality of feed axes, and
   the determination part of each feed axis control part notifies all of the notification parts of the feed axis control parts when it determines to turn of the learning control, and
   the determination part of each feed axis control part sets the oscillation command, to zero and turns off the learning control using at least one of a self-determination of turning off the learning control and the determination to turn off the learning control received from the determination part of another feed axis control part.

5. The control device according to claim 1, wherein the oscillation command generation part generates the oscillation command by subtracting the oscillation amplitude from a reference axis of a cosine wave as an offset value.

6. The control device according to claim 1, wherein the oscillation command generation part generates an oscillation frequency of the oscillation command such that the workpiece or the tool is shifted by a half-cycle each time the workpiece or the tool makes one revolution based on the rotation speed, and generates an oscillation amplitude of the oscillation command based on the rotation speed and the position command.

7. The control device according to claim 1, wherein the oscillation command generation part generates the oscillation frequency and the oscillation amplitude of the oscillation command such that the torque of the at least one feed axis does not exceed a predetermined value.

8. The control device according to claim 1, wherein the oscillation command generation part generates the oscillation frequency and the oscillation amplitude based on a control bandwidth of the learning control so that learning converges.

9. The control device according to claim 1, wherein the oscillation command generation part generates the oscillation frequency and the oscillation amplitude based on a desired length of swarf generated by the tool processing the workpiece.

10. The control device according to claim 1, wherein the workpiece comprises a corner part which is not continuous with the radially outermost portion of the workpiece on the side which is more radially inwards than the radially outermost part in a cross-section along the central axis thereof.

* * * * *